Patented Dec. 8, 1942

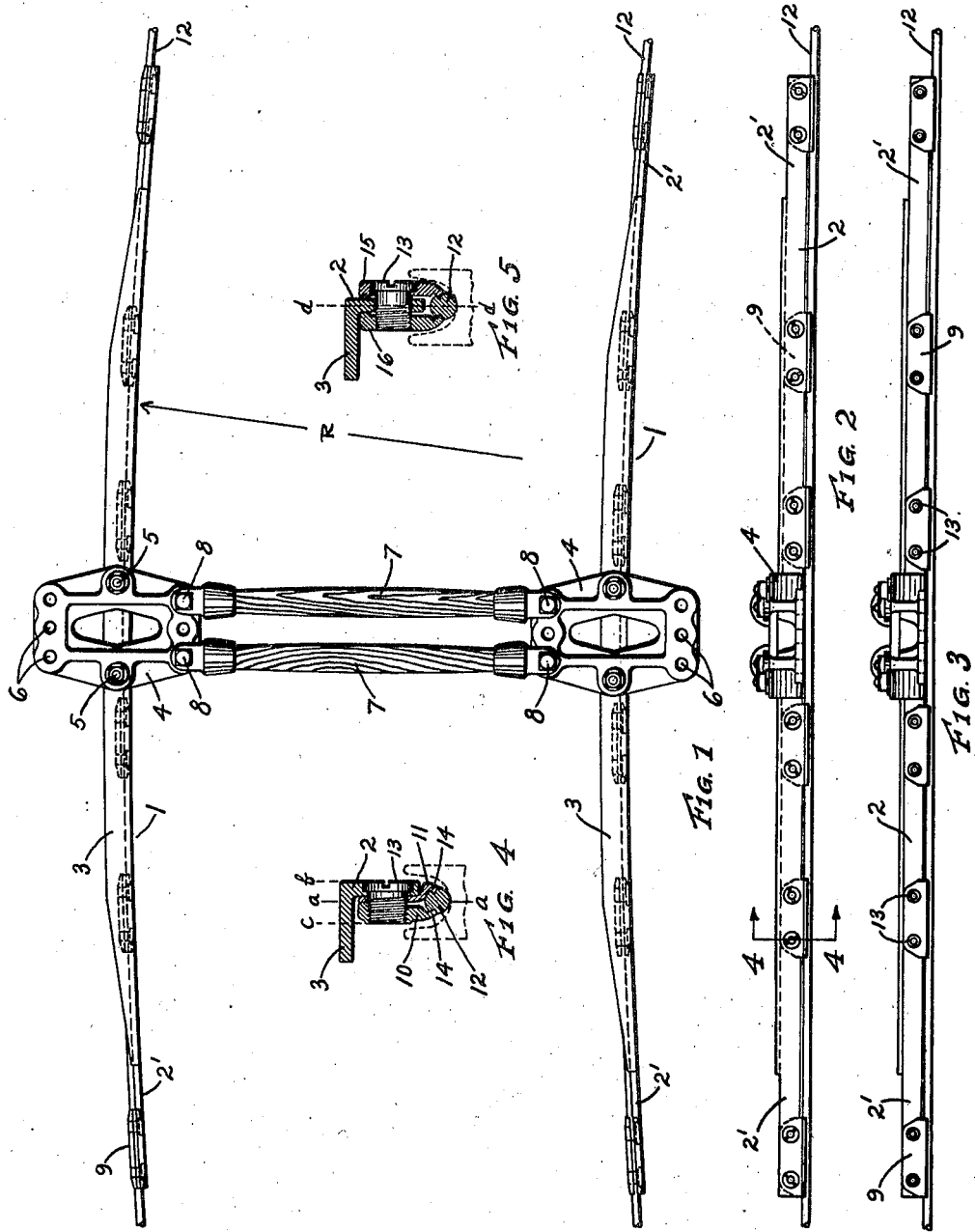

2,304,763

UNITED STATES PATENT OFFICE 2,304,763

TROLLEY WIRE SUPPORT

Samuel S. Matthes, Mansfield, Ohio, assignor to The Ohio Brass Company, Mansfield, Ohio, a corporation of New Jersey Application May 27, 1941, Serial No. 395,375

6 Claims. (Cl. 191—40)

My invention relates to supports for trolley wires forming a part of overhead trolley systems used in the operation of electrically propelled vehicles.

One object of my invention is to provide a support for a pair of trolley wires forming part of an overhead trolley system.

Another object of my invention is to provide a support for a pair of continuous trolley wires forming a part of a curve in an overhead system.

Another object of my invention is to provide a support for a pair of trolley wires forming part of a curve in which the trolley wire is in contact with the current collector during its entire passage when passing the support.

Still another object of my invention is to provide a simple, inexpensive support for a pair of trolley wires forming part of an overhead system, which may be quickly and easily installed.

Other objects of my invention will be evident to those skilled in the art from my drawing and description which follows.

While I have set forth some of the objects of my invention as applied to a support for a pair of trolley wires on a curve, my invention is also applicable to supporting a single trolley wire either at a curve or in a straight line portion of the system.

My invention resides in the new and novel construction, combination and relation of the parts herein described and shown in the drawing.

In the drawing:

Fig. 1 shows a top plan view of my invention as arranged for supporting a pair of trolley wires of opposite polarity.

Fig. 2 is a side view in elevation of the concave face of my invention shown in Fig. 1.

Fig. 3 is a side view in elevation looking at the convex face of my invention as shown in Fig. 1.

Fig. 4 is an enlarged section taken on the line 4—4 of Fig. 2.

Fig. 5 is an enlarged section of a modification of the clamping portion of my invention corresponding in position to that of Fig. 4.

It is sometimes desirous in constructing a curve for an overhead trolley system to employ a continuous trolley wire or wires in which the current collectors may contact the trolley wire or wires throughout their passage through the curve portion of the system.

A number of trolley wire supports are in use which permits of the use of a continuous trolley wire, but which are so arranged that the current collector engages with a guiding surface on an elongated bar.

In the preferred embodiment of my invention, I employ a horizontally disposed curved bar 1 which is provided with vertically disposed portions 2—2' of such proportions that the same will flex or bend laterally under side pull of the trolley wire. To provide a bar which will not bend under side strain of the trolley wire but maintain the desired curvature thereof, as in case of a short radius of curvature, I provide a laterally projecting portion 3 which extends along the bar 1 at or adjacent to the upper edge thereof. The portions 2—2' are preferably of uniform cross-section throughout their length.

The portion 3 may extend the full length of the bar or segment 1, but I prefer to have it extend for the major length of the bar leaving the end portions 2' free to flex or bend sufficiently under side strain of the trolley wire to permit the ends of the bar and the trolley wire to align themselves in order to avoid an abrupt change in the direction of travel of the current collector. If the radius R of the trolley wire is sufficiently large or the side pull thereof is not too great, the portion 3 may be omitted.

To support the segment or bar 1, I provide a plate-like member 4 which is secured to the bar as by bolts 5. The member 4 is provided with openings 6 to receive supporting cables and when two bars or segments are employed, I connect the members 4 by means of insulating members 7 secured to the members 4 by bolts 8. The bars are thus held in spaced and insulated relation to support two trolley wires of opposite polarity.

The trolley wire is held in fixed relation to the vertical portions 2—2' of the bar 1 by means of a plurality of clamps 9 spaced along the portions 2—2' of the bar 1 and each formed of a pair of clamping members 10 and 11 held in position relative to the vertical portions 2—2' and in clamping relation with the trolley wire 12 by means of screws 13.

The clamping member 10 may be thicker than the member 11 or preferably formed with a boss, thus permitting the screws 13 to secure a better threaded engagement than the portions 2—2' of the bar would provide as the members 2—2' are made relatively thin to provide lightness as well as flexibility when and where needed. The screws 13 may, of course, be reversed under proper conditions.

The clamping member 11 is relatively thin as it is interposed between the member 10 and the portions 2—2'. The clamps 9 are supported laterally against the side pull of the trolley wire by the portions 2—2'.

The lower portion of the clamping members 10 and 11 extend below the lower edge of the bar and are so constructed and related to the bar that the longitudinal axis of the trolley wire is in a vertical plane $a$—$a$ which is midway between the vertical planes $b$ and $c$ of the vertical concave face of the bar 1 and the outer face of the clamps 9 respectively. The plane $a$—$a$ is not central of the clamping members 10—11 but is offset laterally which offsets the axis of the wire.

Since the vertical portions 2—2' of the bar are relatively thin and the clamping member 11 is also thin, the total width of the support on the section 4—4 of Fig. 2 and, as shown enlarged in Fig. 4, is relatively small, thus giving sufficient clearance between the clamping members 10—11 and the portion 2—2', and the flanges of the current collector.

The lower portion of clamping member 11 projects laterally beneath the vertical flange 2—2' of the bar 1 or in other words underlies and this materially aids in reducing the total thickness of the support at each clamp.

The lower edge of each clamp is provided with inwardly projecting and cooperating means 14 to grip the trolley wire; Fig. 4 shows a grooved type of trolley wire.

The trolley wire is preferably held in very close relation to the lower edge of the vertical portion 2—2' of the bar 1, and the small spacing between the wire and the member 2—2' is dependent upon the thickness of the clamp member 11. This small spacing permits of a slight resilient action of the wire under upward pressure of the current collector, depending upon the spacing of the clamps and the amount of upward pressure of the collector. There would be no objection to the wire contacting permanently with the lower edge of the portions 2—2' of the bar 1.

It will be recognized from an inspection of Figs. 1 and 4 that the concave face of the device is free from obstructions to the smooth passage of a grooved current collector across the device and that the trolley wire forms also a smooth passage. This is essential because in rounding a curve at the speeds employed today, the current collector tends to move outwardly towards the concave face of the device through centrifugal action and unless the concave face is unobstructed, dewirement will constantly occur and under such operation the device could well be said to be inoperative.

In Fig. 5 is a section of a modification of my clamping arrangement corresponding to the section shown in Fig. 4. In the modification, the clamping members 15 and 16 are disposed on opposite sides of the vertical portions 2—2' and are held in position relative to the bar on the trolley wire by the screws 13. In this arrangement the longitudinal axis of the wire is in central plane $d$—$d$. This construction is quite impossible of commercial use as the clamping members 15 will offer obstructions to the passage of a grooved current collector.

This modified construction, while practical, does not give the clearance for the flanges of the current collector which is secured by the construction of Fig. 4, but may be found useful to meet certain requirements.

Having described my invention, I claim:

1. A supporting device for a trolley wire comprising an elongated metal bar formed to a predetermined radius of curvature to be disposed in parallel relation to the trolley wire, a plurality of spaced clamps disposed along the bar on one and the same side thereof, each clamp formed of two members, each having a portion disposed below the bar, the said portions having cooperating means to receive and grip the trolley wire and hold it below the bar in spaced relation thereto with the intervening portion of the trolley wire spaced from the lower edge of the bar, means to secure the members of each clamp in position on the bar and draw the members into holding relation with the trolley wire, the portion of the inner clamping member disposed below the bar formed to underlie the lower edge of the bar, whereby the longitudinal axis of the wire is brought closer to the concave edge of the bar, the thickness of the inner clamping member being less than that of the bar or of the over-all thickness of the other clamping member whereby the minimum spacing of the trolley wire below the bar is substantially that of the thickness of the inner clamping member and supporting means secured to the bar adjacent its longitudinal center and projecting in opposite directions from the bar and having means to receive supporting means for the device.

2. A support for a curved trolley wire and a guide for a grooved current collector comprising an elongated vertically disposed curved bar to parallel the trolley wire, a plurality of clamps disposed along the convex vertical face of the bar and in spaced relation to each other to grip and hold the trolley wire, each clamp comprising a pair of members and means to secure the members to the bar and to clamp the trolley wire, a portion of each clamp projecting below the lower edge of the bar, one clamping member being thinner than the other clamping member and interposed between the other clamping member and the bar and the downwardly projecting portion thereof underlying the lower edge of the bar but not projecting beyond the concave face of the bar whereby the longitudinal axis of the trolley wire is held central of the space between the vertical planes of the concave face and the outer face of the clamp and the concave side of the device will be free of obstructions to a passing grooved current collector, supporting means attached to the bar adjacent its longitudinal center and means on the supporting means to receive supports for the device.

3. A support for a trolley wire comprising an elongated vertically disposed curved bar to parallel a continuous trolley wire, a plurality of clamps disposed along the convex vertical face of the bar and in spaced relation to each other to grip and hold the trolley wire, each clamp comprising a pair of members and means to secure the members to the bar and to simultaneously clamp the trolley wire, a portion of each clamp projecting below the lower edge of the bar, one clamping member interposed between the other clamping member and the bar and the downwardly projecting portion thereof underlying the lower edge of the bar but not extending laterally beyond the concave face of the bar, the projecting portion of each member provided with means to engage and hold the trolley wire whereby the longitudinal axis of the trolley wire is held central of the space between the vertical planes of the concave face of the bar and the outer face of the clamp, the portion of the trolley wire between each clamp being unsupported both laterally and vertically, laterally projecting means along one edge of the elongated bar for a portion of the length thereof to render the said portion nonbendable under side stress, the remaining portion of the bar adapted to flex under side strain of the trolley wire, supporting means attached to the bar adjacent its longitudinal center and means on the supporting means to receive supports for the device.

4. A support for a trolley wire and guide for a grooved current collector comprising an elongated vertically disposed curved bar to parallel the trolley wire, a plurality of clamps disposed along the convex vertical face of the bar and in spaced relation to each other to grip and hold the trolley wire, each clamp comprising a pair of members and means to secure the members to the bar and to clamp the trolley wire, a portion of each clamp projecting below the lower edge of the bar but not projecting beyond the concave face of the bar whereby the said bar presents a smooth and uninterrupted surface on the concave side thereof, one clamping member of less thickness than the other clamping member interposed between the said other clamping member and the bar and the downwardly projecting portion thereof underlying the lower edge of the bar whereby the longitudinal axis of the trolley wire is held central of the space between the vertical planes of the concave face and the outer face of the clamps, supporting means attached to the bar adjacent its longitudinal center and means on the supporting means to receive supports for the device.

5. A device to support a trolley wire at a curve comprising an elongated curved bar having two portions bendable under side strain of the trolley wire and connected with rigid portions, transversely disposed means attached to the rigid portion of support the bar, spaced holding means positioned along the rigid portion of the bar on the convex side thereof to receive and hold the trolley wire below the bar and to the curvature of said curved bar, holding means attached to the bendable portions to receive and hold the trolley wire in predetermined relation to the bar below the bar, the bendable portions and the said holding means thereon operating to permit the adjustment of the bar ends into alignment with the trolley wire attached thereto, the said holding means along the bendable and rigid portions each comprising a pair of clamping members attached to the curved bar on the convex side thereof, the inner clamping member being substantially thinner than the outer clamping member and the bar and both clamping members having the lower portions thereof projecting below the lower edge of the bar to support the trolley wire entirely below the bar and partly underlying the bar but not projecting beyond the concave face of the bar whereby a grooved current collector in moving across the device will have continuous uninterrupted contact with the trolley wire and concave edge of the bar.

6. A supporting device for a continuous trolley wire comprising, an elongated vertically disposed curved bar to parallel the trolley wire, a plurality of clamps disposed along the convex vertical face of the bar and in spaced relation to each other to grip and hold the trolley wire, each clamp comprising a pair of members and means to secure the members to the bar and to the trolley wire in clamping relation thereto, a portion of each clamp projecting below the lower edge of the bar, one clamping member interposed between the other clamping member and the bar and the downward projecting portion of the said one clamping member underlying the lower edge of the bar but not extending laterally beyond the concave face of the bar, the projecting portion of each clamping member provided with means to engage and hold the trolley wire whereby the longitudinal axis of the trolley wire is held substantially central of the space between the vertical planes of the concave face of the bar and the outer face of the clamp, the portion of the trolley wire between each clamp being unsupported both laterally and vertically, supporting means attached to the bar adjacent its longitudinal center and means on the supporting means to receive means to support the said supporting means.

SAMUEL S. MATTHES.